Figure 1:
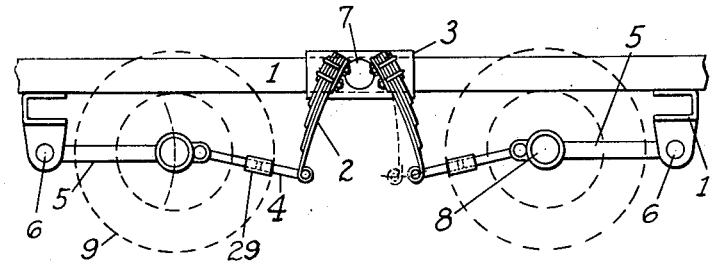

Jan. 30, 1940.  E. FAVARY  2,188,654

SUSPENSION FOR CAR WHEELS

Filed June 12, 1937  2 Sheets-Sheet 1

INVENTOR.
Ethelbert Favary

Jan. 30, 1940.                E. FAVARY                2,188,654
                        SUSPENSION FOR CAR WHEELS
                        Filed June 12, 1937        2 Sheets-Sheet 2

INVENTOR.
Ethelbert Favary

Patented Jan. 30, 1940

2,188,654

UNITED STATES PATENT OFFICE 2,188,654

SUSPENSION FOR CAR WHEELS

Ethelbert Favary, Burbank, Calif.

Application June 12, 1937, Serial No. 147,937

13 Claims. (Cl. 280—104)

This invention comprehends new and useful improvements in suspensions of wheels used more particularly for motor vehicles, trailers, electric surface cars, railroad cars, or other horseless or horse-drawn vehicles and it is especially advantageous where a plurality of wheels are comparatively close together such as the wheels of a multiple wheel truck as employed on railroad cars, or the wheels on the two rear axles of the well known six-wheel road vehicle; it consists essentially in a suspension so arranged that the difference in the distance between the body of the vehicle and the axles is not dependent on a corresponding ratio of spring deflection or tension of whatever yielding resisting means are employed.

In most present day suspensions used on motor vehicles, or cars running on rails, the difference in the distance between the axle and the body, brought about by a difference in the wheel load, is dependent on a corresponding ratio of "give" in the spring; the amount of "give" or flexure of the springs being proportional to the difference in the distance between the axle and the part to be cushioned.

In the present invention, the tension on the spring or on the resisting means does not vary in proportion to the load or to the change in the distance between the axle and the body, but said tension may be made to vary very little in comparison with changes in the load.

For a fuller understanding of my invention, reference is to be had to the following specification and drawings wherein I have described and shown some forms of my invention. They may be modified or varied, however, without departing from the spirit of my invention.

In the drawings forming part of this specification, corresponding and like parts are indicated by the same reference characters.

Figure 1A:
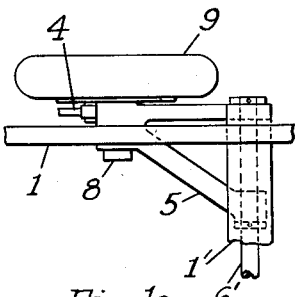
Figure 2:
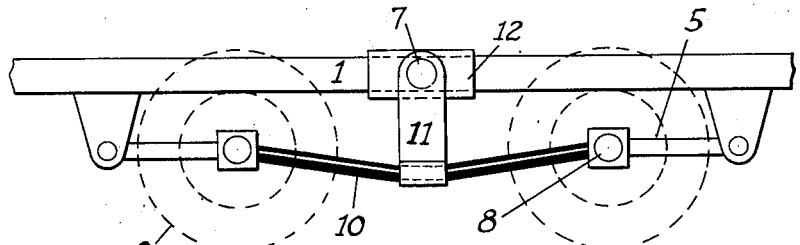
Figure 3:
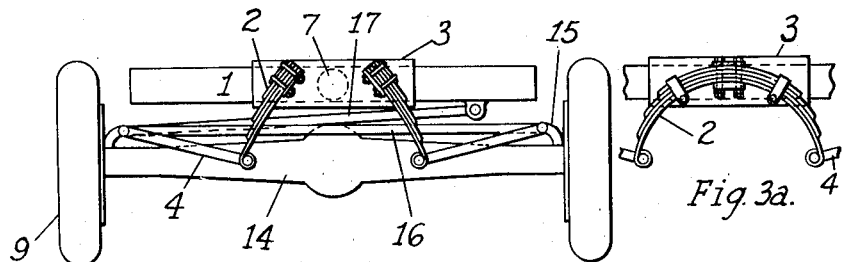
Figure 6:
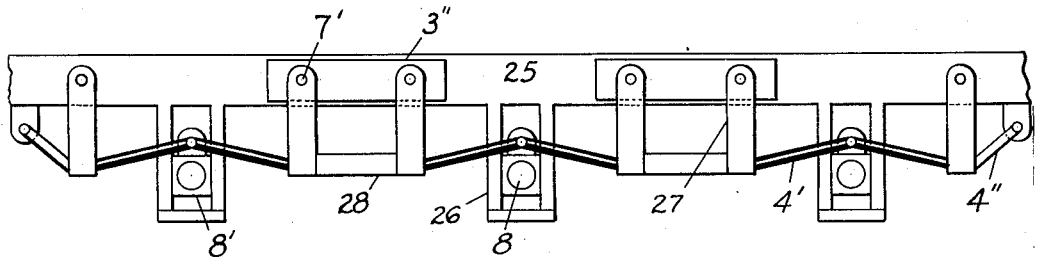
Figure 7:
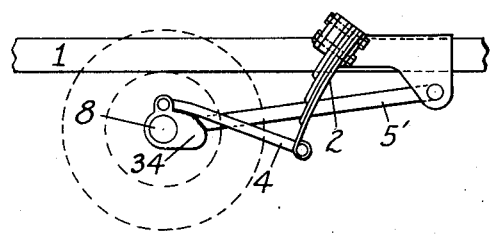
Figure 8:
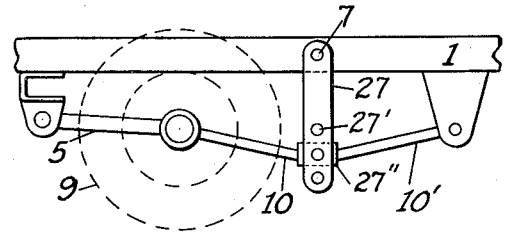
Figure 9:
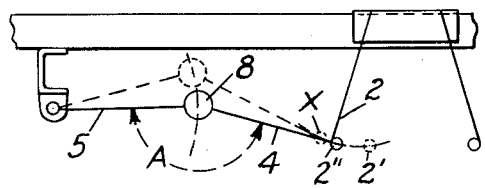
Figure 10:
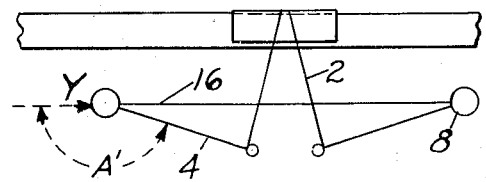

Fig. 1 is a diagrammatic side-view of my suspension, showing two wheels supported by two leaf springs, and Fig. 1a, a partial plan view of Fig. 1. Fig. 2 is a modified form of the invention where I use rubber instead of springs. Fig. 3 shows a rear view of a motor vehicle, embodying my invention, Fig. 3a a fragmentary view similar to Fig. 3, of a modification of my invention, using a single spring instead of two separate springs, and Figs. 4, 5 and 6 side views of my suspension applied to rail cars or railroad car trucks. Fig. 4a is a fragmentary view of a journal box similar to those shown in Fig. 4, and illustrating the manner in which an additional yielding medium may be provided. Figs. 7 and 8 show modified forms of the invention as applied to single wheels. Figs. 9 and 10 show diagrams describing some phases of the action of the suspension.

In Fig. 1, 1 denotes the frame of a vehicle, 2 the leaf springs mounted on a support or spring bracket 3, 4 are tension members connecting the end of the leaf springs with the axle or with brackets 5, said brackets being in longitudinal tension, and oscillate on pivots 6. It is understood, of course, that the wheels may be individually suspended as shown in Fig. 1a, and rotate on, or with, axle 8, depending on whether it is a dead or a live axle, or the said axle may extend from one side of the vehicle to the other, with another wheel on the other side of the vehicle, as is the usual practice on railroad cars or on the rear of motor vehicles.

Spring bracket 3 may be rigidly attached to the frame or pivotally, as shown at 7, which latter construction would tend to equalize the load on both springs and on both wheels. For instance, if wheel 9 at the left should mount over an obstruction on the road, said wheel would rise, thereby increasing the tension on the spring at the left, and this increased tension will tend to turn the bracket clockwise around pivot 7 (which may consist of a bar extending from one side of the vehicle to the other) thereby increasing the tension on the spring at the right, in this manner substantially equalizing the load on both the wheels. It should be noted that the tension on the spring is imparted through the tension member 4, while the reaction of said tension is counteracted by the tension in bracket or member 5, one end of which is pivoted to the frame at 6, while the other end holds the axle 8, or the axle housing, and guides the axis of the wheel in a definite path around center 6, with member 5 forming the radius.

Fig. 1a is a partial plan view and it shows how the bracket 5 may be pivotally attached to 6' at widely separated points, the pivot or shaft 6' being attached to frame cross-member 1'.

Instead of springs, 2 may represent a solid, non-yielding construction, while 4 may be the yielding resisting means which would elongate under tension.

Fig. 2 shows such a modified construction where I use rubber bands, rubber bars or blocks 10 in tension. 11 is a support, one end of which is attached to the frame or to another superstructure or bracket 12, while the other end holds the rubber element, or any other suitable yielding resisting means, for both wheels 9. The upper end of support 11 may be rigidly attached to the frame 1, or pivoted at 7, which would tend to equalize the load on both wheels. The lower end of support 11 clamps the rubber element 10, which here is shown made in one piece, held in the middle by said support. Wherever the rubber is held by metallic parts, it may be vulcanized to them and attached thereto in any suitable manner.

Fig. 3 shows how I apply my invention, in a modified form, to the rear end of a motor vehicle. Here 14 represents the rear axle housing, said housing taking the reaction of the springs through members 15 which form a part of the axle housing. It should be noted that the axle housing is in compression longitudinally, while members 4 are in tension. If found desirable I may use another compression member 16, as shown, to relieve the rear axle of the stresses arising by virtue of the spring tension. To give the construction increased lateral stability, I may use a cross bar 17, pivotally attached to the frame and to the axle housing. When there is a tendency for frame 1, with the body it is carrying, to move to the right, said bar 17 would be under tension, while if the frame tends to move to the left it would be in compression. In most cases this bar 17 may not be necessary since many motor vehicles have other means for giving lateral stability, as are well known in the art.

The spring bracket 3 may be rigidly attached to frame 1, or through pivot 7. One of the advantages of using a pivotal attachment is that when one wheel rides over an obstruction on the road, or sinks into a depression, the frame and the load it is carrying, would not be subjected to the rapid upward or downward forces arising from the wheel, as the springs and support 3 could oscillate around pivot 7, and the frame would tend to remain horizontal. Instead of using two separate springs I may employ a single spring structure attached to the frame at the center, as illustrated in Fig. 3a, which is self-explanatory.

Figure 4:
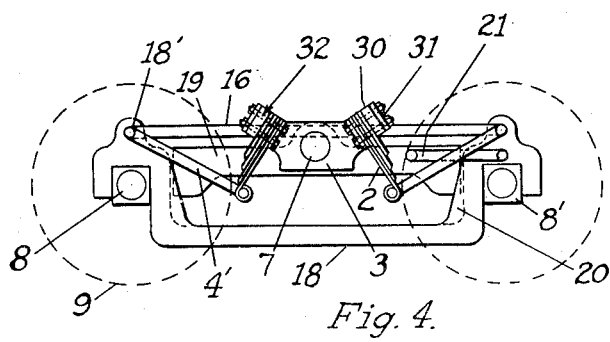
Figure 4A:
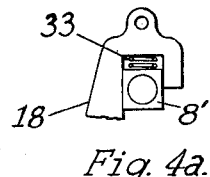

A modified form of construction is disclosed in Fig. 4, which shows my invention applied to a car truck, such as used with cars running on rails. In this case the member 18 (which is a common construction to hold the journal boxes 8', and thus the axles 8, in their respective positions) takes the reaction of the springs, through tension members 4', hence member 18 is substantially in compression longitudinally. If found necessary I may employ a separate compression member 16. One end of the tension members 4', is attached to the ends of the springs, while the other end is pivotally attached at 18' to member 18, which supports the axle. Instead of tension members 4' being of solid construction I may make them of a yielding medium, like rubber, so that under load the rubber would stretch thereby increasing the cushioning effect between the wheels and the axles. In practice when using such a yielding resisting medium I may find it advantageous to substitute solid or non-yielding members for the springs 2 shown in this figure, in which event 3 would represent a bracket to which said solid members are attached, bracket 3 being attached to structure 19. By pivoting the bracket at 7, the load on both wheels and the tension on the resisting means would be more efficiently equalized. The body of the car and its load is, in this construction, carried by structure 19 which is in sliding contact with, and is guided by, member 18, through slots or grooves 20. Instead of said slots, or in addition thereto, I may use any other suitable means between the wheels and the car body or frame, to hold the wheels in their respective positions with regard to the body of the car as, for example, by providing a radius and thrust rod 21 between members 18 and 19. The function and construction of such radius and thrust rods are well known in the art in connection with motor vehicles.

In order to still further increase the cushioning effect, I may use coil springs 33 or any other yielding medium between journal box 8' and structure 18, as disclosed in Fig. 4a.

Figure 5:
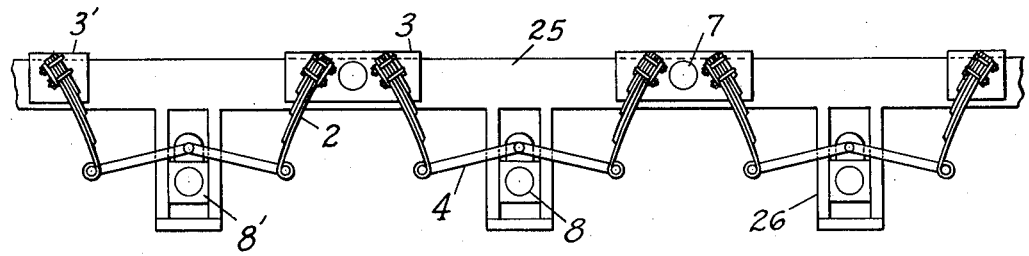

Fig. 5 shows my invention applied to a railroad car, where three rear wheels are close together. Here 25 denotes the frame or the main structure which has projections or guides 26 which guide the journal boxes 8' and prevent the axles and wheels from longitudinal and lateral displacement with respect to the superstructure or the car body. In this case too, I may substitute yielding resisting means, like rubber, for the rigid or non-extensible tension members 4, and instead of springs 2, I may use rigid structures as shown in Fig. 6. In this last mentioned figure, 4' represents the tension members composed of a yielding resisting medium, as for instance, rubber, the supports 27 being of rigid material. Any variation in the load on 25, or on the wheels, will cause the axles and journal boxes 8' to move up or down in guides 26, causing said tension members to yield, that is to say, to elongate more or less as the case may be. In order to make the construction more flexible, I may use additional yielding resisting means by making the connection or connecting link 28 between two adjacent supports 27, of rubber. In this manner the proportionate increase in length of 4' and of 28 would not be so great, thus stressing said yielding resisting means to a lesser extent than if only one of them were of a yielding nature. If 28 is made of a yielding material, I prefer to pivot the supports 27 independently at 7', as shown in this figure.

In order to tension the springs or the yielding resisting means, I provide suitable tensioning means. In Fig. 1, 29 represents a turnbuckle with a right and left hand thread, as is well known in the art. By turning said turnbuckle in one direction, it would shorten the member 4, thereby increasing the tension on the spring, whereas if turned in the opposite direction, it would reduce the spring tension. In Fig. 4, I show filler blocks or wedges 30 applied between the spring and the right angle bend 31, which forms part of the spring bracket 3; the springs being attached to the bracket by any convenient means; in the drawings I have shown spring clips 32 for this purpose.

Fig. 7 shows a modified form of the invention, when applied to individual wheels. In this case 5' denotes a bracket, which is in longitudinal compression. In other respects the action is similar to that of Figs. 1 and 2. However, in order to vary the spring tension or the cushioning effect to a greater degree at any position of the axle with respect to the frame, I make the tension member 4 or a portion of it of pliable material and provide means for shortening or lengthening said member 4 in operation. In Fig. 7, I have indicated one way of accomplishing this result by shaping projection 34 which forms a part of the axle housing, or of member 5', to which 4 is attached, in such a manner, that if the distance between the axle and frame should decrease, the length of member 4 would decrease, since the tension member 4 would come into contact with projection 34 and bend said member 4. This in turn will cause an increase in the spring deflection and hence giving a spring with a correspondingly larger ratio of increasing stiffness at a given distance between axle and frame. I may, of course, use this construction in any of the other forms of the invention I have shown. For example, in Fig. 1, I would substitute the tension member by that shown in Fig. 7, and provide the projection 34 on the end of bracket 5.

Fig. 8 illustrates a modified construction showing a single wheel suspended by tension member 5 and yielding resisting means 10 and 10'. 27 is a rigid member pivoted at 7 to frame 1. In order to increase the tension in the yielding resisting means or tension members 10 and 10', I may provide holes 27' in rigid member 27, for the purpose of placing 27'', which holds 10 and 10', at different heights, in member 27, in order to change the stiffness of the yielding resisting means.

In practice I find it advantageous to have the springs, or the yielding resisting means, in great initial tension, or in great tension at comparatively light loads on the frame. However, when such load is increased, the distance between the axle and the frame or the superstructure, becomes smaller, thereby decreasing the angle between the tension member and the member taking the reaction of the force of the tension member. In Fig. 9, angle A is shown to be decreased when the axle moves upward with respect to the frame, as shown dotted. When such angle is decreased by an increase in the load, the proportionate increase in the tension of the tension members (or the increase in the compression of the compression members) is, as a rule, relatively small, yet the increase in the load causing such decreased angle may be comparatively large.

In Fig. 9, the position of the spring eye would be at 2' if the spring were unstressed, while when the axle 8 moves up a given distance with respect to the frame, as shown dotted, the spring eye would move only from 2'' to X.

In Fig. 10, the direction of the force of the compression in the compression member 16 would be substantially as indicated by the dotted line and arrow Y, and the angle A' would be a determining factor as regards the increased longitudinal tension in members 4, or compression in compression member 16; this increased tension and compression being approximately proportional to the ratio of the increase in the spring flexure to the total spring flexure. In Fig. 9, for example, the total spring flexure under normal load is indicated by the distance of the spring eye from 2' to 2'', while double the ordinary load, or a shock amounting to double the normal load will cause the spring eye to move to X, which is only a fraction of the distance from 2' to 2''. The magnitude of the motion of the spring eye for a given increase or decrease in the distance between the axle and the car body, depends also on the length of the tension members and the brackets 4, which are in tension, or bracket 5 which is substantially in compression, see Fig. 7. In other respects this last named bracket is similar to that shown in Figs. 1 and 1a. The amount of spring eye motion also depends, among other things, on the length and position of the springs and on the position of the pivotal connection between the brackets and the frame, since the axles, or wheels, in their motion up and down with respect to the frame, are guided by the brackets.

It is to be understood that the wheels of any of the constructions I have shown or described may be driving wheels, that is to say, they may be driven in any suitable manner as is well known in the art in connection with motor vehicles, electric surface cars, rail cars, or wherever driving wheels are used, and the wheels may be individually suspended (see Fig. 1a) and individually driven, or they may be suspended and driven as shown in Fig. 3, or as is the usual practice with electric surface cars.

Having now described my invention, what I claim as new and desire to protect by Letters Patent is:

1. In a suspension for a plurality of adjacent car wheels, a bracket for each of said wheels, one end of each bracket pivotally attached to the car structure, means connecting the other end of each bracket to a wheel journal, yielding resisting means for cushioning each of said wheels with respect to the car and spaced from said journal in a horizontal direction, a tension member connecting one end of said yielding resisting means with the journal end of said bracket and having such length that comparatively large vertical axle motion results in but small "give" in the resisting means, and means for substantially equalizing the load on the wheels.

2. In a suspension for a plurality of adjacent car wheels, a bracket for each of said wheels, one end of each bracket pivotally attached to the car structure, means connecting the other end of each bracket to a wheel journal, springs for cushioning said wheels with respect to the car and spaced from said journals in a horizontal direction, tension members connecting one end of said springs with the journal ends of said brackets and having such length that large vertical axle motion results in but a small spring flexure, and means inter-connecting the other ends of said springs and pivotally mounted upon the car structure.

3. In a suspension for a plurality of adjacent car wheels, axles and axle journals for the wheels, means for preventing said journals from substantial lateral and longitudinal displacement with respect to the car, interrelated yielding resisting means for cushioning adjacent wheels with respect to the car, a pair of tension members disposed between adjacent axles and connecting the wheel journals with the yielding resisting means, said tension members being so disposed as to be substantially horizontal at light loads, becoming less horizontal with an increase in load, and having such length that large vertical axle motion results in a comparatively small "give" in the resisting means.

4. A suspension for a plurality of car wheels as in claim 3, and means for substantially equalizing the load on the wheels.

5. In a suspension for a plurality of adjacent car wheels, axles and axle journals for the wheels, a superstructure, projections extending from the superstructure for preventing lateral and longitudinal displacement of the axles with respect to the superstructure, yielding resisting means for cushioning the wheels with respect to the superstructure, substantially horizontal tension members connecting the axle journals with said yielding resisting means, and means causing a decrease in the angle of the longitudinal forces in the tension members with an increase in the wheel loads.

6. In a suspension for a plurality of car wheels, as in claim 5, and means for substantially equalizing the load on the wheels.

7. In a suspension for a plurality of adjacent car axles, wheels on said axles, yielding resisting means for cushioning said axles with respect to the car and spaced from said axles in a horizontal direction, a plurality of suspension members substantially horizontal at light loads and in longitudinal tension, means connecting the suspension members with the axles and with the yielding resisting means in such a manner as to allow large vertical axle motions for small variation in the "give" of the resisting means, said "give" becoming proportionately larger at increasing axle motions, means for substantially equalizing the load on a plurality of wheels, and means for guiding the wheels in their respective positions relative to the car to prevent substantial longitudinal and lateral displacement of the wheels with respect to the car.

8. In a suspension for a plurality of adjacent car axles, wheels on said axles, a plurality of leaf springs disposed between said axles, a bracket, said springs attached to said bracket, a plurality of comparatively long and substantially horizontal suspension members in longitudinal tension and carrying substantially the entire load on the said axles, one end of each suspension member attached to one end of a spring and the other end of each suspension member connected with an axle, and means for guiding the wheels in their respective positions relative to the car to prevent substantial longitudinal and lateral displacement of the wheels with respect to the car.

9. In a suspension as in claim 8 and means for substantially equalizing the load on a plurality of wheels.

10. In a suspension for a plurality of adjacent car axles, wheels on said axles, a plurality of substantially vertical leaf springs disposed between said axles, the upper ends of the springs attached to a frame structure, a plurality of comparatively long and substantially horizontal suspension members in longitudinal tension and carrying substantially the entire load on the axles, one end of each suspension member attached to one end of a spring, the other end of each suspension member connected with an axle, the reaction of the tension in the springs and in the suspension members of adjacent axles resisted by compression in substantially the entire length of said frame structure between said adjacent axles, and means for guiding the wheels in their respective positions relative to the car to prevent substantial longitudinal and lateral displacement of the wheels with respect to the car.

11. A suspension as in claim 10 and means for substantially equalizing the load on a plurality of wheels.

12. In a suspension for a plurality of adjacent car axles, means for mounting said axles for relatively great vertical motion as compared with that of ordinary car axles and for preventing effective longitudinal and lateral displacement with respect to the car, an elongated tension member for each axle extending in a substantially horizontal direction at light loads on the axles, yielding resisting means disposed between said axles, one end of said tension member being flexibly coupled to one axle and the other end thereof being flexibly coupled to the yielding resisting means whereby relatively great vertical movement of the axle results in comparatively small flexure of said yielding resisting means, and means mounting said yielding means for shifting movement between the adjacent axles to substantially distribute and equalize the loads on said axles when said axles move vertically with respect to the car.

13. In a suspension for a plurality of adjacent car wheels, axles and axle journals for the wheels, a superstructure, projections extending vertically from the superstructure for preventing lateral and longitudinal displacement of the axle with respect to the superstructure, yielding resisting means for cushioning the wheels with the superstructure, substantially horizontal tension members connecting the axle journals with said yielding resisting means, means causing a decrease in the angle of the direction of the longitudinal forces in the tension members with an increase in the wheel loads, means for substantially equalizing the load on the wheels and means causing a shortening in the length of the tension members in operation at a predetermined distance between the axle and the frame member.

ETHELBERT FAVARY.